June 28, 1927.
S. W. ALDERFER
1,633,620
PROCESS FOR THE MANUFACTURE OF TIRE BEADS
Filed Oct. 20, 1926   2 Sheets-Sheet 1
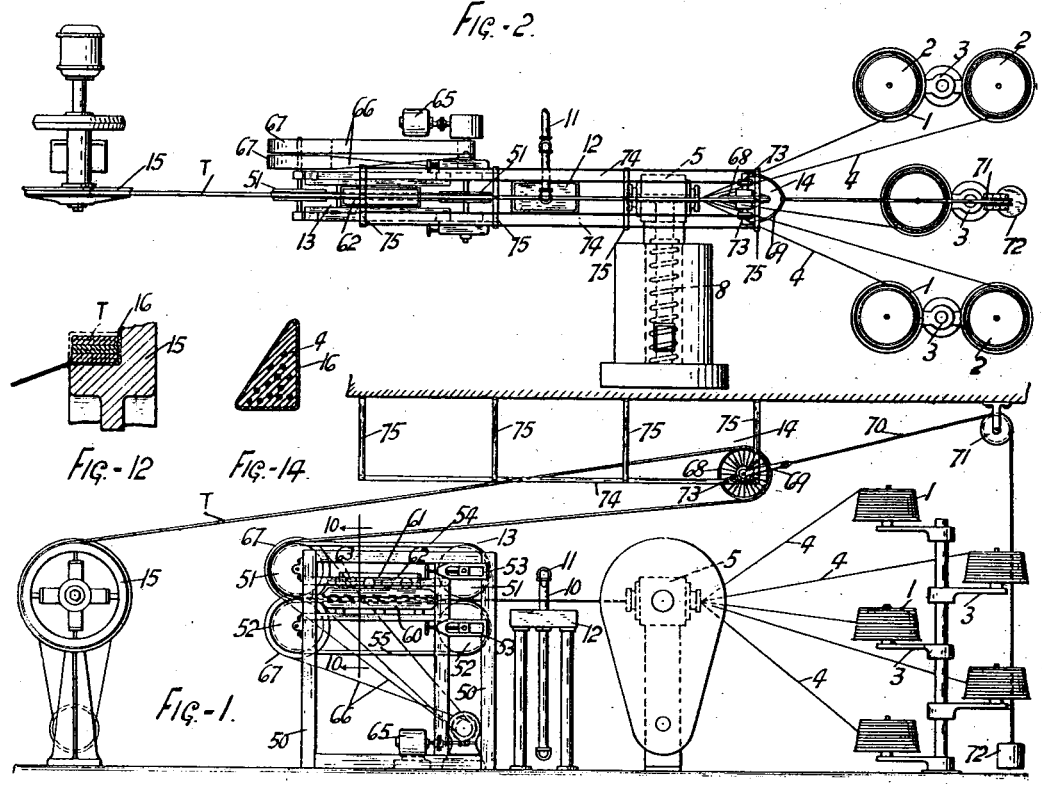
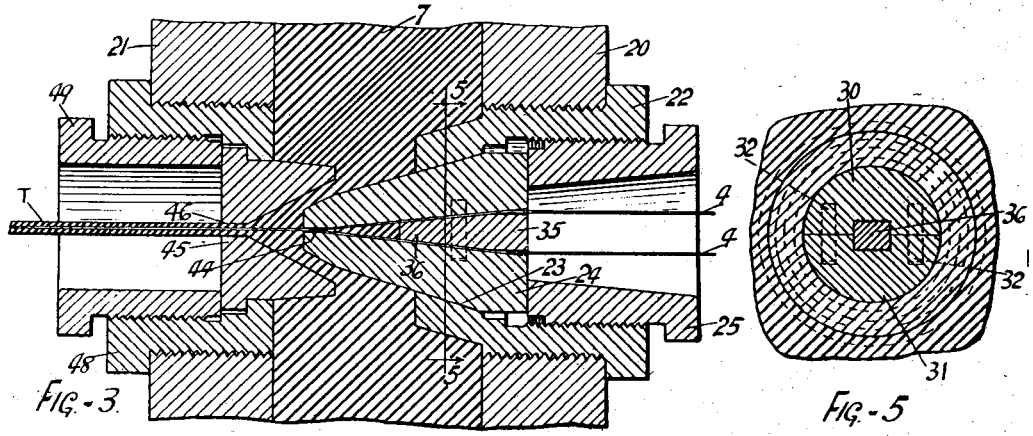
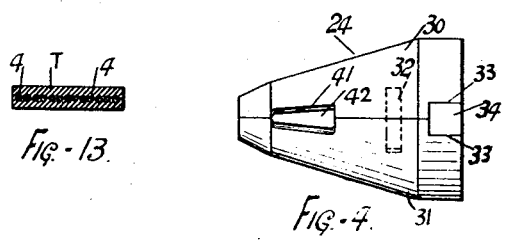
INVENTOR.
STERLING W. ALDERFER
BY
Ely T Barrow
ATTORNEY.

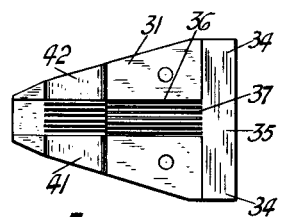
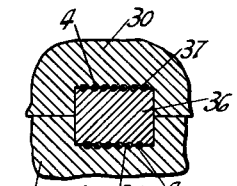
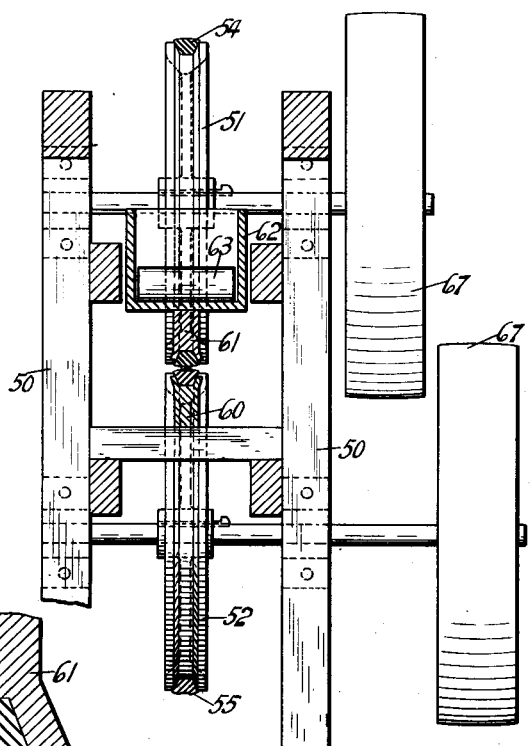
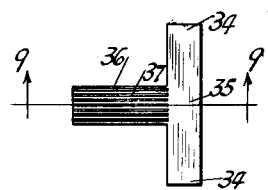
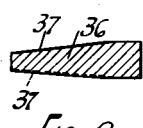
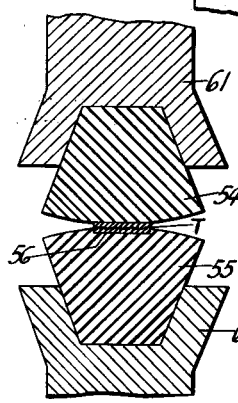
INVENTOR.
STERLING W. ALDERFER.
BY
ATTORNEY.

Patented June 28, 1927.

1,633,620

UNITED STATES PATENT OFFICE.

STERLING W. ALDERFER, OF AKRON, OHIO.

PROCESS FOR THE MANUFACTURE OF TIRE BEADS.

Application filed October 20, 1926. Serial No. 142,948.

This invention relates to a new and improved process for use in the manufacture of beads for use in pneumatic tire structures or for the manufacture of bead reenforcements. Objects of the invention are to improve upon the methods of manufacture and reduce the cost.

In the tire bead of the usual or standard form for pneumatic tires of the straight-side or inextensible bead type, a metallic reenforcement is incorporated in the beads of the tire. This reenforcement is usually in the form of a flat tape made of a plurality of small wires which are held together in tape form by braiding or by the use of a light filler wire woven back and forth across the wires. The tape formed by either method is given a coating of rubber which is for the purpose of surrounding and embedding the wires in a mass of rubber which, when the bead is constructed by any of the usual methods, is covered and given a preliminary vulcanization to mold and set it in the form of a tire bead or the bead may be incorporated directly in the carcass without preliminary vulcanization, or in the green state.

It has been thought essential heretofore to form the wires into a tape by either of the methods described as an operation preliminary to the application of the rubber coating. These tape forming operations add very considerably to the cost of manufacture of the tire, employing expensive machinery and operators.

The purpose of the present invention is to eliminate the weaving or braiding operations by taking the unconnected wires directly from reels or coils and passing them through a die in which the wires are brought closely together in a bunch or tape-like structure, and coated and surrounded with a mass of tenacious rubber composition which maintains the wires in their close relationship in substantially the tape-like form. From the machine the tape may be led directly to the bead building ring upon which it is wound the required number of times to form the tire bead which is covered and given a preliminary cure in the manner as carried out heretofore, although it is possible to carry on the actual building of the bead as a separate operation.

The perfection of the present method and machine effects the saving to the tire manufacturers of vast sums which are paid for the weaving or braiding operations.

The tape obtained in the manner described is as efficient and strong as prior forms of tape and, in addition, is more flexible than tapes of former constructions and can be more easily shaped and molded to the usual triangular cross-section in which the beads are formed. It also is more adaptable for the so-called "drum built" tires than prior bead constructions.

In the drawings is shown one form of apparatus which has been found practical for the manufacture of tire beads by the method forming the subject matter of the present application. The machine illustrated herein is the subject matter of a divisional application Serial No. 170,106, filed Feb. 23, 1927. It will be understood, however, that the drawing and description is merely illustrative of the method in which the invention may be embodied or carried out, and changes or modifications thereof will fall within the scope of the invention as set forth in the claims hereto appended.

In the drawings:

Figure 1 is a side elevation of a complete unit for the manufacture of the uncured tire bead;

Figure 2 is a plan view;

Figure 3 is an enlarged view of the die;

Figure 4 is a side view of the nozzle of the die;

Figure 5 is a cross-section on the line 5—5 of Figure 3;

Figure 6 is a face view of a section of the die;

Figure 7 is an enlarged section through the entrance to the die;

Figures 8 and 9 are a plan and a section, respectively, of the separator or spreader, the latter being on the line 9—9 of Figure 8;

Figure 10 is an enlarged cross-section of the compressing and drawing device which draws the tape through the die and compresses it while the tape is cooling and obtaining its set, the section being taken on the line 10—10 of Figure 1;

Figure 11 is an enlarged detail of the tape within the drawing device;

Figure 12 is a cross-section through the bead forming ring;

Figure 13 is a cross-section of a tape; and

Figure 14 is a bead which has been given the usual preliminary shaping and vulcanization.

In practicing the present invention, the tire manufacturer receives the bare wire, which constitutes the basis of the bead, in coils or rolls, a plurality of which, indicated at 1, are mounted upon swifts or reels, indicated at 2, carried upon supports 3, suitable braking mechanism (not shown) being provided to prevent the reels or swifts from overrunning.

The individual wires 4 are led from their separate sources, through a die head, indicated at 5. At the die the wires are encased and surrounded with a mass of rubber 7, the wires and the rubber issuing from the die in the form of a rubber tape or ribbon T in which the wires are firmly embedded.

The die is heated to enable the rubber to be forced about the wires by a screw feed 8, so that the rubber is warm and plastic. In order to chill the rubber and cause it to harden immediately so that it will regain its original tenacity and may be subsequently treated, it is cooled immediately upon leaving the die, preferably by subjecting it to a spray of water 10 which flows from a pipe 11 and discharges into a suitable drainage receptacle 12.

The rubber surrounding the numerous wires, while preliminarily cooled by the spray, is still somewhat warm and plastic and the tape may be distorted by the tension upon the wires if it is bent at this time. It is, therefore, desirable that the tape T be not bent or otherwise distorted, causing movement or shifting of the wires. The device for drawing the wires through the die, which is indicated generally at 13, is preferably of the type shown and is so constructed that the tape is maintained in flat condition and held under a certain degree of compression until it has become partially set. A full description of the device will be given in a later portion of the specification, it being sufficient to state here merely that the object to be obtained is to hold the tape in flat condition while it is under tension from the drawing mechanism.

From the drawing device 13, the tape passes over a compensator or takeup 14 which is preferably of the horizontal type to reduce the action of the wires and onto the rotating bead forming ring 15 which is controlled by the operator so that a sufficient number of turns of the tape are laid up upon the ring, here shown as three layers, although that number may be changed. The tape is cut off; the end being prevented from being pulled back by the compensator by any suitable means. The layers of tape are laid up over a covering fabric 16 which is wrapped about the bead, as shown in dotted lines in Figure 12. When the bead is partially cured, the whole structure is changed to the usual triangular section, shown in Figure 14, the wire shifting to accommodate the new cross-section. The rubber tape manufactured in accordance with this invention lends itself to the latter operation more easily than the woven or braided wire tape formerly used, as it is more flexible due to the fact that the wires are not connected together but simply held in the casing of rubber which will become fluid in vulcanization, permitting the rearrangement of the wires.

Difficulty may be encountered in causing the numerous wires which constitute the bead reenforcement to be held together solely by the mass of tenacious rubber which surrounds the wire unless the rubber is thoroughly forced into the interstices in the mass of wires, and for the purpose of accomplishing this result in a satisfactory manner, the form of die shown in details in Figures 3 to 9 is employed.

The wires are led from their separate sources and are divided into a plurality of groups, here shown as two groups, which are separated and spaced apart and a portion of the rubber is forced into and between the groups of wires while they are so spaced. The subsequent drawing together of the wires and additional encasement with rubber causes a very thorough penetration of rubber into and about the wires.

In the apparatus as shown in Figure 3, the numerals 20 and 21 represent, respectively, the two walls of the die head. In the wall 20 is received a screw-threaded die casing 22, the inner portion of which is provided with a tapered or conical seat 23, in which is received the first die or nozzle 24 through which the several wires are passed. This die is retained in its seat by a threaded plug 25 screwed into the casing 22.

The die or nozzle 24 is formed of two sections or halves 30 and 31, which together form a substantially cone-shaped nozzle separated along a central plane. The two sections are held together in the conical seat 23 by the plug 25 and are properly positioned by means of dowels 32. The rear face of the sections 30 and 31 are formed with mating notches 33, in which are seated the lateral arms 34 of a T-shaped spreader 35, the shank 36 of which lies between the die sections and extends toward the mouth thereof. The groups of wires referred to pass on either side of the spreader, and the opposed faces of the sections or the spreader, or both, are formed with grooves 37 which serve as guides for the wires.

The spreader terminates short of the die opening, as shown in Figure 3, to afford a chamber between the groups of wires, which chamber is constantly filled with rubber from the main body of rubber within the die head under pressure from the feed screw, the rubber entering the chamber through a passageway 41 at the side of the nozzle closest to the feed screw and passing out thorugh a more restricted opening 42 at the opposite side of the die. The two groups of wires completely embedded in the rubber which has been thus forced between them, pass out of the nozzle or die 24 through its restricted mouth 44.

The feature which has just been described, i. e., the forcing of rubber between the spaced groups of wires and the subsequent bringing together or compacting of the wires into the rubber, while not essential, nevertheless is an important one to the present invention, for by this means a thorough and complete embedding of the wires in the rubber is obtained, which is desirable in order to grip and hold the wires in the tape form without any other holding agent than the mass of rubber.

The mouth 44 of the nozzle 24 is somewhat smaller than the finished tape. It is placed close to the opposite wall 21 and is in register with a second die 45 spaced about the nozzle so that an additional mass or jacket of rubber is forced about the wires, the completed tape issuing in the form shown in Figure 13 through the reduced opening 46 in the die 45. The die 45 is seated in a die casing 48 screwed into the wall 21 and is held in place by a screw-threaded plug 49.

It is necessary to draw the tape through the die. In former practices this was usually done by passing the tape about driven rolls. It was found, however, that such practice was not so desirable in the present process for the reason that the bending of the tape about the rolls caused the wires to shift and separate. For this reason the tape is drawn out in flat condition and maintained in such condition as long as practicable or until the hot plastic rubber has obtained at least a partial set and the tension relieved.

After the tape passes through the spray 10 it goes into the drawing and compressing device 13. This comprises a frame work 50 in which are mounted pairs of horizontally arranged pulleys 51 and 52, one pulley of each pair being provided with the usual belt tightening device 53. Over the pulleys are trained belts 54 and 55, the lower and upper runs of which are parallel and closely positioned with respect to one another. One of the belts, here shown as the belt 55, is provided with a shallow groove 56 in which the tape T is received, the groove being somewhat shallower than the thickness of the tape. The lower belt is supported and guided in a grooved horizontal runway 60, while the upper belt is guided in a horizontal bearing plate 61, each of which extends along the length of the belts between the pulleys. The bearing plate 61 is pressed downwardly with sufficient yielding pressure to securely grip the tape and incidentally to compress it while it is being drawn through the machine. A trough 62 rests for this purpose on top of the bearing plate, being loaded with any suitable quantity of weights 63 to secure the desired result. The belts are driven in the same direction by means of a motor 65 and straight and crossed belts 66 running over pulleys 67 mounted upon the pulley shafts.

As the drawing machine and the die are continuously operated and the bead ring is intermittently operated, preferably at a higher speed than the drawing machine, it is advisable to interpose a compensator or storage device between these two elements. Such a compensator is shown at 14, being preferably of a horizontal type so as to avoid, as much as possible, bending of the tape. The compensator is preferably arranged above the apparatus and comprises a floating pulley or wheel 68, to which is attached, by a fork 69, a cable 70. The cable passes over a pulley 71 and supports a counterweight 72. The pulley is supported upon rollers 73 which run over tracks 74 suspended from the ceiling by hangers 75. As the tape is withdrawn by the rotating bead drum, the pulley 68 moves forwardly over the tracks, and as the supply of tape is replenished from the element 13, the pulley will recede. In this manner a supply of tape is kept in the machine at all times.

The operation and advantages of the invention will be understood by those skilled in this art. The changes and modifications which may be suggested to those skilled in this art will not depart from the scope of the invention.

What is claimed is:

1. The process of manufacturing tire beads, comprising leading a plurality of individual wires from separate sources, dividing the wires into groups, forcing a mass of tenacious rubber about the wires while the groups are spaced apart, reducing the wires and the rubber to a flat tape whereby the wires are brought into substantially the same plane, encasing the tape so formed with a jacket of rubber, cooling the tape, and winding a plurality of layers thereof into a ring constituting the bead.

2. The process of manufacturing tire beads, comprising leading a plurality of individual wires from separate sources, dividing the wires into groups, forcing a mass of tenacious rubber about the wires while the groups are spaced apart, reducing the wires and the rubber to a flat tape whereby the wires are brought into close relationship with one another, cooling the tape, and winding a plurality of layers thereof into a ring constituting the bead.

3. The process of manufacturing tire beads, comprising leading a plurality of individual wires from separate sources, dividing the wires into groups, forcing a mass of tenacious rubber between the groups, drawing all of the wires together into intimate relation surrounded and encased by rubber, and winding a plurality of layers thereof into a ring constituting the bead.

4. The process of manufacturing tire beads, comprising conducting a plurality of uncovered and unconnected wires from a plurality of individual sources into and through a mass of tenacious rubber, drawing said wires together in intimate relation while in the rubber, extruding the wires as a strip in which the wires are held together solely by the rubber, and forming a tire bead from the strip so obtained.

5. The process of manufacturing tire beads, comprising conducting a plurality of unconnected individual wires from a plurality of supplies into and through a mass of tenacious plastic rubber, surrounding and encasing the wires with a rubber covering to form a strip in which the wires are held together solely by the rubber, and forming a tire bead from the strip so obtained.

6. The process of manufacturing tire beads, comprising conducting a plurality of unconnected wires from a plurality of supplies, forcing a mass of tenacious rubber into the wires while spaced apart, bringing all of the wires into intimate relation, surrounding and encasing the wires with a jacket of the same rubber composition, and winding the tape so obtained directly into a tire bead.

7. The process of manufacturing tire beads, comprising conducting a plurality of unconnected wires from a plurality of supplies, forcing a mass of heated tenacious rubber into the wires while spaced apart, bringing all of the wires into intimate relation, surrounding and encasing the wires with a jacket of the same rubber composition, chilling the rubber, and winding the tape so obtained directly into a tire bead.

8. The process of manufacturing tire beads, comprising conducting a plurality of unconnected wires from a plurality of supplies, forcing a mass of heated plastic rubber into and about the wires, compressing the wires and rubber together while the rubber chills and hardens, winding the strip of wire and rubber thus obtained into a ring, and subsequently forming a tire bead from the ring thus obtained.

9. The process of manufacturing tire beads, comprising conducting a plurality of unconnected wires from a plurality of sources through a die, spacing the wires apart, forcing a mass of heated tenacious rubber into and about the wires, bringing the wires into intimate relation, drawing the wires through the die without bending for a sufficient distance to enable the rubber to chill and harden, and winding the tape into ring form.

10. The process of manufacturing tire beads, comprising conducting a plurality of individual wires through a die, forcing a mass of heated tenacious rubber in and about the wires and thereby forming a tape, chilling said tape, compacting the tape without bending, and winding a length of said tape into ring form.

11. The process of manufacturing tire beads, comprising conducting a plurality of individual wires through a die, forcing a mass of heated tenacious rubber in and about the wires and thereby forming a tape, and drawing and compacting the tape without bending until the rubber has had sufficient time to regain its tenacious properties.

12. The process of manufacturing a reenforcement for tire beads, comprising conducting a plurality of individual wires arranged in spaced groups into a mass of rubber, forcing the rubber between the groups of wires, bringing all of the wires into intimate contact while in the mass of rubber, and drawing and compressing the tape thus formed without bending.

13. The process of manufacturing a reenforcement for tire beads, comprising conducting a plurality of individual wires arranged in spaced groups into a mass of tenacious heated rubber, forcing rubber between the groups and drawing the groups together until the wires are in intimate relation in the rubber, and incorporating the tape thus formed into a tire bead.

14. The process of manufacturing a reenforcement for tire beads, comprising conducting a plurality of individual wires arranged in spaced groups into a mass of tenacious heated rubber, forcing rubber between the groups and drawing the groups together until the wires are in intimate relation in the rubber, drawing the tape thus formed, and cooling and compacting the tape.

15. The process of manufacturing a reenforcement for tire beads, comprising conducting a plurality of individual wires arranged in spaced groups into a mass of tenacious heated rubber, forcing rubber between the groups and drawing the groups together until the wires are in intimate relation in the rubber, drawing the tape thus formed, and cooling and compacting the tape without bending until the rubber has regained its tenacious properties.

STERLING W. ALDERFER.